United States Patent [19]

Hinman et al.

[11] Patent Number: 4,819,190

[45] Date of Patent: * Apr. 4, 1989

[54] VIDEO LINE PROCESSOR

[75] Inventors: Daryl E. Hinman; Vernon A. Anderson; Jon H. Bumgardner, all of Ridgecrest, Calif.

[73] Assignee: The United States of America as Represented by the Secretary of the Navy, Washington, D.C.

[*] Notice: The portion of the term of this patent subsequent to Apr. 28, 2004 has been disclaimed.

[21] Appl. No.: 875,892

[22] Filed: Jun. 18, 1986

[51] Int. Cl.⁴ .......................... G09G 1/00; G06K 9/36
[52] U.S. Cl. ......................... 364/521; 382/47; 382/41
[58] Field of Search ............... 382/41, 46, 47; 340/731; 364/724, 745, 521, 518, 522

[56] References Cited

U.S. PATENT DOCUMENTS

| | | | |
|---|---|---|---|
| 3,311,739 | 1/1963 | Aiken et al. | 364/745 |
| 3,935,381 | 1/1976 | Petrocelli et al. | 178/7.1 |
| 4,002,824 | 1/1977 | Petrocelli et al. | 358/180 |
| 4,020,332 | 4/1977 | Crochiere et al. | 364/724 |
| 4,163,249 | 7/1979 | Michael et al. | 358/21 R |
| 4,220,965 | 9/1980 | Heitmann et al. | 358/22 |
| 4,282,546 | 8/1981 | Reitmeyer et al. | 358/22 |
| 4,344,149 | 8/1982 | van de Meeberg et al. | 364/724 |
| 4,417,276 | 11/1983 | Bennett et al. | 358/160 |
| 4,447,882 | 5/1984 | Walz | 364/22 |
| 4,463,372 | 7/1984 | Bennett et al. | 358/22 |
| 4,484,347 | 11/1984 | Kashioka | 382/47 |
| 4,578,812 | 3/1986 | Yui | 382/47 |
| 4,584,659 | 4/1986 | Stikvoort | 364/724 |
| 4,610,026 | 9/1986 | Tabata et al. | 382/47 |
| 4,622,650 | 11/1986 | Kulish | 364/745 |
| 4,661,987 | 4/1987 | Anderson et al. | 382/47 |

OTHER PUBLICATIONS

Woods et al., "Subband Coding of Images" 10/86 IEEE Trans. an ASSP vol. ASSP-34 No. 5.

Primary Examiner—Gary V. Harkcom
Assistant Examiner—Phu K. Nguyen
Attorney, Agent, or Firm—William C. Townsend; Melvin J. Sliwka; Stephen J. Church

[57] ABSTRACT

A video line processor for varying the size of a video image portion along a video line in an image processor in which image size variation occurs first along horizontal lines and then along vertical lines and in which intermediate and final frames are stored in memories in which row and column addressing is interchanged on alternate frames. The line processor has a line memory for storing pixel values along each video line, has a pair of arithmetic circuits, one of which receives pixel values delayed in relation to pixel values received by the other, and has a coefficient memory with memory locations corresponding to pixel values along a video line, each of these locations being loaded between video frames with an address for the line memory and with coefficients for the arithmetic circuits to control, respectively, the position of each pixel value along a line and the transformation of the value.

10 Claims, 6 Drawing Sheets

VIDEO LINE PROCESSOR

BACKGROUND OF THE INVENTION

1. Field of the Invention

The subject invention pertains to the Field of electrical computers and data processing systems. More particularly the invention pertains to pictorial communication where data presented on a CRT is controlled to provide special effects.

2. Description of the Prior Art

It is well known to digitally represent a video image, such as a conventional video frame, by digitizing successive analog signals representing successive horizontal lines of the frame and storing numerical values representing the brightness of successive elements or pixels along each line as successive elements along a row of a two-dimensional array with the values representing successive lines stored as successive rows so that successive sets of corresponding elements along the rows are elements of successive columns of the array. When an entire frame is represented as such an array, it is well known to use a transform based on the geometry of similar figures to calculate pixel values of an image of a different size than an image present in the original frame, successive such transforms being used to give a "zoom" effect. In such a transform it is known to interpolate between the brightness of adjacent pixels of a portion of the original image to determine the brightness of a pixel or pixels representing a corresponding portion of the varied image.

This prior art approach to image size variation is straight forward when there are no constraints on time and processor power and memory size and when the size variations between every successive pair of frames are known in advance. However, at the standard video frame rate of 30 frames per second with each frame represented, typically, by an array having about 500 elements in each row and column, it is evident that a vast amount of digital memory is required to store frames giving a zoom effect lasting a few seconds. Further, the general solution for varying the size of an image represented by such an array involves the possible effect of every original image pixel in every transformed image pixel so that, in a 500 by 500 array $(500 \times 500)^2$ or $6.25 \times 10^{10}$ calculations might be involved. As a result, such processing to achieve video image size variations in real or near real image time is not practical, especially when greater pixel resolution or a faster frame rate is desirable as when testing a control system for a fast moving vehicle by successive images varied in size to simulate approach to an object.

It is, of course, possible when sufficient memory is available to generate in non-real time a plurality of arrays representing successive video frames and then output the frames in real time if the size variation between images of every successive pair of frames are known in advance. However, when testing the dynamic response of a control system to movements of an object represented by simulated images, it is evident that each image is not known until the control system has responded to the previous image. As a result, it is not possible to generate images in advance for such control system testing. In dynamic response testing it is, of course, not possible to slow down the presentation of successive images to much less than real time and obtain significant results representing true real time dynamics of a control system.

SUMMARY OF THE INVENTION

The video line processor of the present invention is useable in a video processor for an entire image in which the size of the image, as represented by a two-dimensional array, is varied by first interpolating along each line or vector of one parallel set of rows or columns of the image and then interpolating along each vector of the other set thereof. The digitized intermediate image of alternate frames is stored along rows of an orthogonally arranged memory and read along columns thereof while the intermediate images of the other frames are stored along columns and read along rows. The interpolations between corresponding pixels of a row are identical for all of the rows as are the interpolations between corresponding pixels of the columns. The subject line processor sequentially receives, at a predetermined interval, pixels of a line of a digitized video image and selectively expands or reduces the portion of the image represented by the line into pixels of a corresponding output line. The processor is characterized by having a plurality of multiply and accumulate circuits each receiving at each interval one of the input pixels with the pixels to each such circuit being delayed a predetermined number of intervals in relation to the pixels to the other circuit or circuits; by having a coefficient memory storing at each addressable location thereof a plurality of factors corresponding to each such circuit for processing of the pixel received thereby during the interval; by having a summing device to combine the outputs of such circuits into the value at the output pixel corresponding to the interval; by having a line memory for inputting and outputting successive pixels of the line, the coefficient memory having also stored at each location an address selecting the line memory input or output location used at the corresponding interval; and by having a pixel counter which successively addresses the coefficient memory and selectively addresses the input or output location of the line memory.

It is an object of the present invention to provide a video line processor for use in varying the size of a video image.

Another object is provide such a line processor for generating in near real time video lines of a succession of images varied in size with the size undefined until immediately prior to the time of generating the image.

Still another object is to provide such a line processor which is particularly useful with a video frame memory in which pixels along one line of an image are read from a row or column of the memory while pixels of an orthogonally related line are stored along the row or column.

BRIEF DESCRIPTION OF THE DRAWINGS

Other object, advantages, and novel features of the invention will become apparent from the following detailed, description of the invention when considered with the accompanying drawing figures, wherein.

DESCRIPTION OF THE PREFERRED EMBODIMENT

Figures 1, 2:
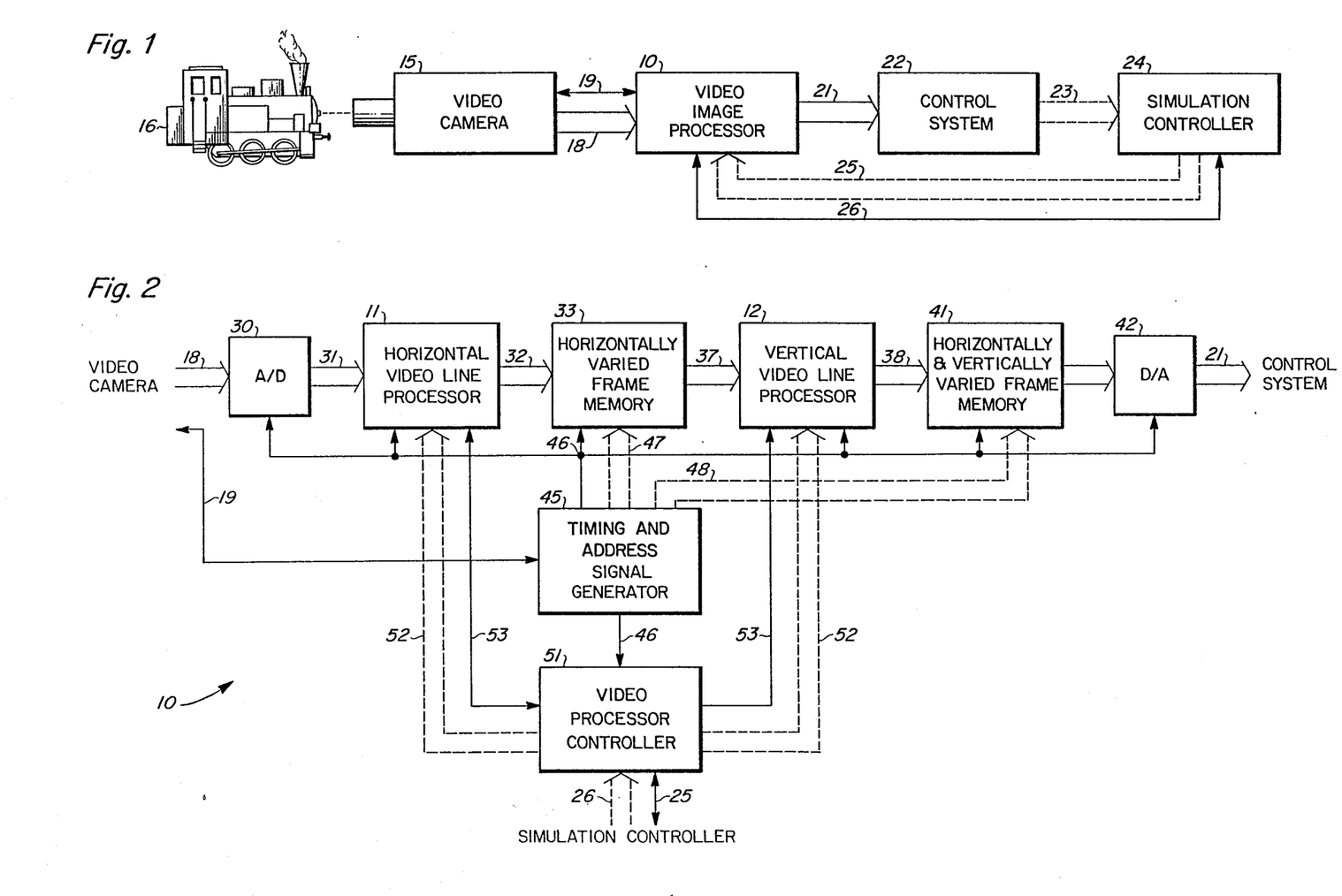
FIG. 1 is a diagram of a control system test arrangement which is the operating environment of the subject video line processor.
FIG. 2 is a block diagram of a video image processor which is shown in FIG. 1 and uses a pair of line processors of the subject invention.

In FIG. 1 an image processor 10, which varies the size of an entire video image, is shown in a representative operating environment. Processor 10 has a general arrangement shown in FIG. 2 and includes a horizontal or first line processor 11 and a vertical or second line processor 12 which embody the present invention.

Processor 10 is used with a video camera 15 which views a model object 16 and outputs to processor 10 a video signal 18 representing the object. Processor 10 and camera 15 are synchronized by well-known signals 19. Processor 10, in near real time, generates from signal 18 a video signal 21 representing an image of object 16 varying in size and/or position from the image of signal 18. Signal 21 is provided to a control system 22 which is being tested and generates a signal 23 representing the dynamic effects on system 22 of the varying image of signal 21. Signal 23 is provided to any suitable simulation controller 24 which, in response to signal 23, generates a data signal 25 to processor 10 determining further images output thereby due to simulated changes in the position of a vehicle controlled by system 22. Processor 10 and controller 24 are synchronized by timing and control signals 26. In FIGS. 1 and 2, as well as the other figures of the subject application, video data signals are represented by broad solid arrows, other data signals are represented by broad dash arrows, and timing and control signals, are represented by solid single line arrows.

As shown in FIG. 2 and FIGS. 5A–5D, processor 10 has a well-known analog-to-digital (A/D) converter 30. Converter 30 receives signal 18, which represents successive video frames, and converts the signal to digitized pixel values corresponding to a predetermined pixel time interval between adjacent pixel values. This interval is determined ultimately by signals 19. A predetermined first number of pixel values corresponding to each horizontal video line is output by converter 30 to an input 31 of processor 11 and transformed thereby by a predetermined transform between these values into a predetermined second number of digitized output pixel values of an output video line. These pixel values are provided from an output 32 of processor 11 to a first or horizontally varied frame memory 33 which is organized in a well-known manner shown in FIG. 5A with orthogonally related rows 34 and columns 35. Processor 12 is similar to processor 11 in having an input 37, which receives successive pixel values representing successive vertical lines of a video image from memory 33, and in having an output 38 from which transformed pixel values are provided to a second or horizontally and vertically varied frame memory 41 organized similarly to memory 33. Pixel values representing successive horizontal lines are output from memory 41 to a well-known digital to analog (D/A) converter 42 which generates signal 21.

Processor 10 has a timing and signal generator 45, shown in FIG. 2, which is associated with signals 19 and which outputs to the balance of processor 10 timing signals 46 derived from signals 19. Generator 45 provides address signals 47 and 48, respectively, to memory 33 and memory 41. Processor 10 has a video processor controller 51 which receives timing signals 46 and exchanges signals 26 with simulation controller 24 while receiving data signal 25 therefrom. Processor controller 51 transmits to line processors 11 and 12 data signals 52 and control signals 53 which are subsequently described in greater detail and are derived from signals originating in simulation controller 24.

Line processors 11 and 12 are substantially identical and will be described with processor 11 as an example shown in FIGS. 3A–3C. Processor 11, considered generally, has a pixel transformation circuit 60 having a pixel input terminal or data input 61 and a pixel output terminal or data output 62, has a coefficient memory 65 having a data output connection 66 and a plurality of storage locations 67 individually addressable through an address connection 68 and corresponding individually to the positions of a plurality of pixel values along a video line, has a counter 70 which is incremented to output successively at a count output 71 thereof a predetermined plurality of count values corresponding individually to a plurality of pixel values along a video line and to the address of locations 67 of memory 65, and has a line memory 75 having a pixel value input port 76 and a pixel value output port 77.

Figure 3A:
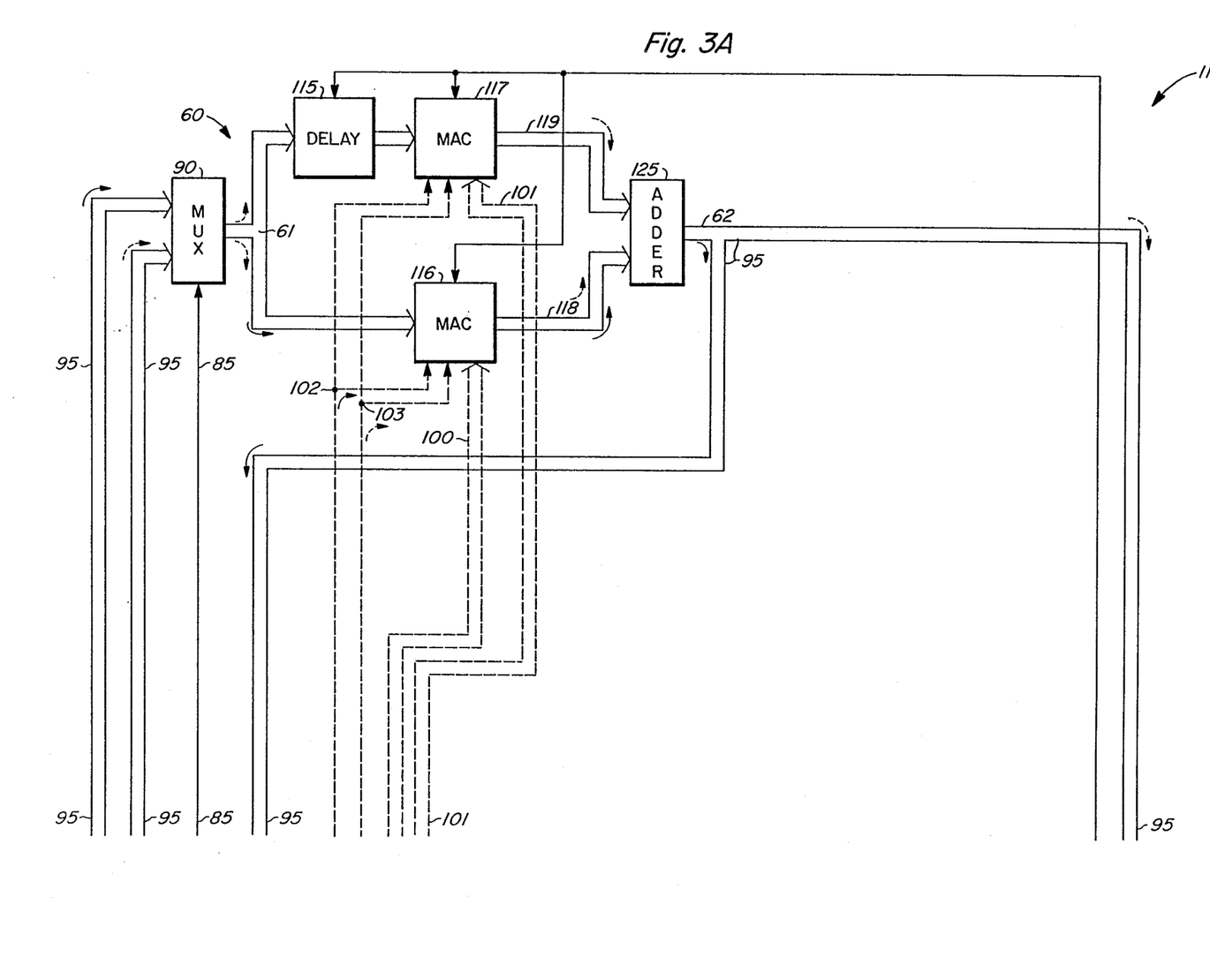
FIGS. 3A, 3B and 3C are a detailed block diagram of the subject line processor.
Figure 3B:
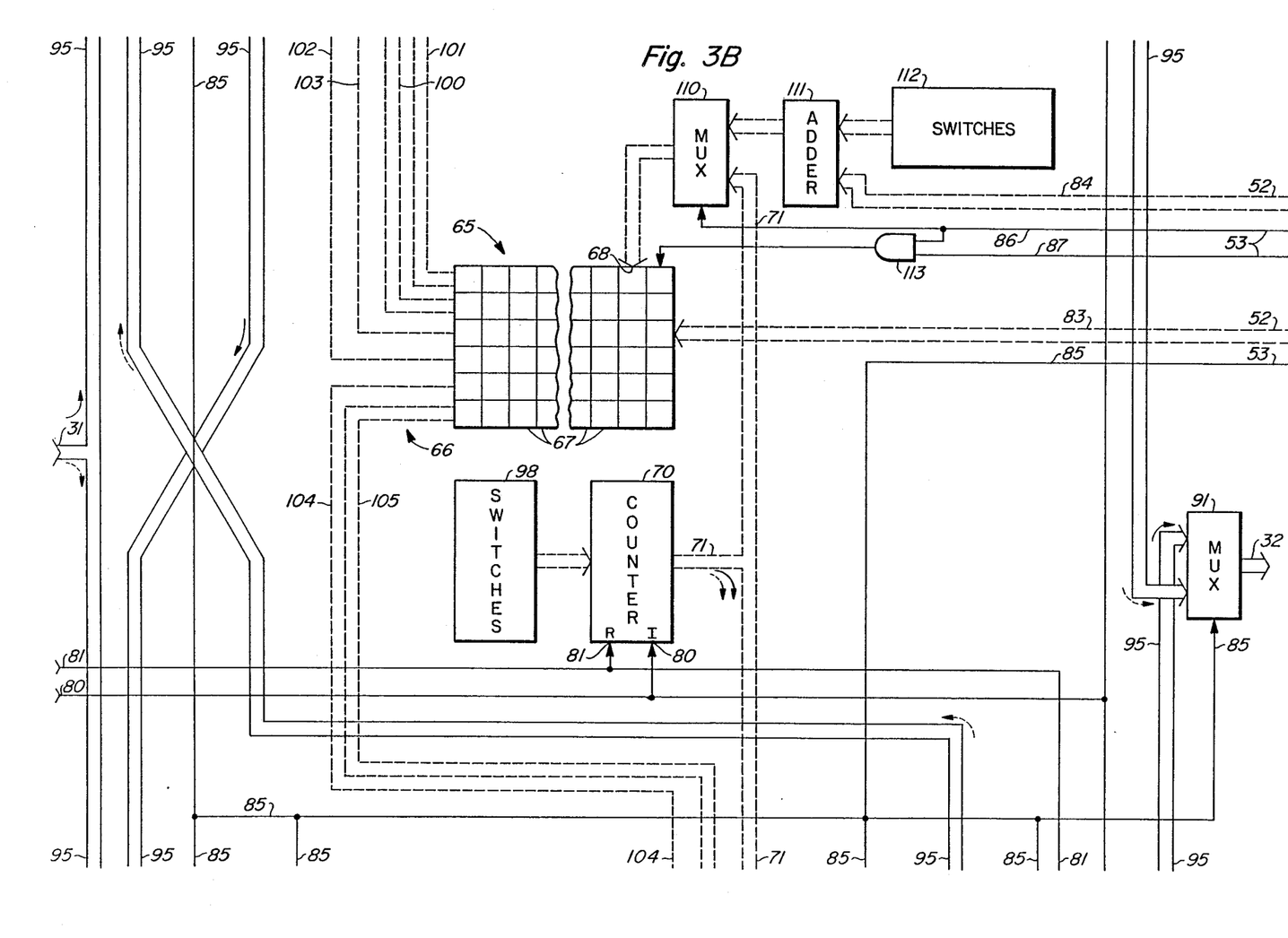
Figure 3C:
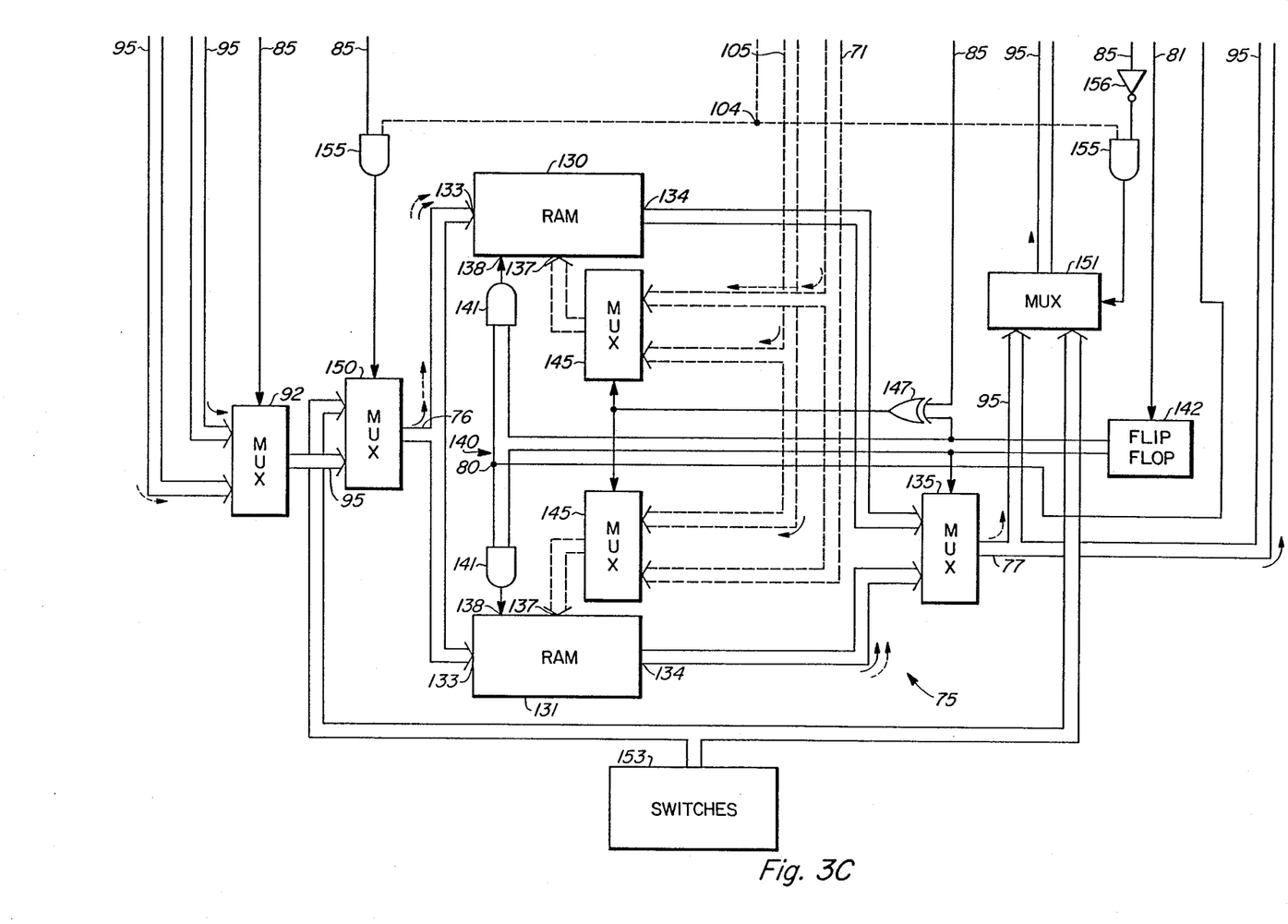

Signals 46, FIG. 2, received by processor 11 from generator 45 include, as shown in FIG. 3, a pixel clock signal 80 defining each pixel time interval and a line clock signal 81 defining the beginning of each video line. Signals 52 received by processor 11 from controller 51 includes a coefficient data signal 83 and a coefficient storage address signal 84 and signals 53 include a mode selection signal 85, a write enable signal 86 and a write clock 87. Mode signal 85 has a first condition for placing processor 11 in a reduction mode and has a second condition for placing this processor in an expansion made.

Processor 11 has pixel data flow control multiplexers 90, 91 and 92 associated, respectively, with input terminal 61, output 32, and input port 76. These multiplexers are receptive to signal 85 and are connected to any suitable pixel data flow channels 95 for, in the reduction mode as indicated by solid arrows alongside the channels, directing pixel values from input 31 to input terminal 61, from output terminal 62 to input port 76, and from output port 77 to output 32 and, in the expansion mode as indicated by dash arrows, for directing pixel values from input 31 to input port 76, from output port 77 to input terminal 61, and from output terminal 62 to output 32.

Counter 70 receives pixel clock 80, line clock 81, and an initial count value set into switches 98. Counter 70 is constructed in any suitable manner to be loaded with this initial value at the beginning of each video line as indicated by clock 81 and to be incremented from this value at each pixel time as indicated by clock 80.

Each storage location 67 of coefficient memory 65 stores a coefficient containing a first or immediate transformation factor output from memory 65 by a channel 100, a second or delayed transformation factor output by a channel 101, an accumulate bit output as a signal 102, a round bit output as a signal 103, a background selection bit or pixel validity indicator output as a background selection or pixel validity signal 104, and a line memory address output by a channel 105. These channels and signals are output from memory 65 via its connection 66, the channels being represented by broad dash arrows and the signals being represented by dash single arrows.

Memory 65 is associated with a multiplexer 110 through which this memory is addressed at connection 68 during pixel transformation by counter 70 through output 71 thereof so that locations 67 of memory 65 are addressed successively during a video line time to output a coefficient from each location so addressed in one pixel time. Multiplexer 110 is adapted, in response to write enable signal 86, to address memory 65 from a adder 111 which sums address signal 84 and the output of address offset switches 112. A gate 113 allows memory 65 to be clocked to input coefficient provided as data signal 83 when write clock signal 87 is asserted during assertion of signal 86.

Transformation circuit 60 has a delay circuit 115 and a first multiply or immediate transformation circuit 116 which receive in parallel the pixel value being input at terminal 61. Circuit 115 is constructed in any suitable manner so as to delay the pixel value so received for one pixel interval and output this value unchanged as a delayed pixel value to a second multiply or delayed transformation circuit 117 of circuit 60. Circuits 116 and 117 are each, a well-known multiply and accumulate circuit (MAC) which receives, respectively, factor signal 100 and factor signal 101. By arithmetic multiplication between the corresponding factor and received pixel value. Circuits 115 and 116 generate, respectively, a first product or immediate output pixel value as a signal 118, and a second product or delayed output pixel value as a signal 119. Each circuit 115 and 116 receives accumulate signal 102 and is adapted, when this signal is asserted, to retain a previous such product or accumulated products, add thereto a newly generated product, and output the accumulation. Each circuit 115 and 116 also receives round signal 103 and, when this signal is asserted, rounds the generated product. Since the factors to circuits 115 and 116 are conventionally regarded as fractional, rounding of such a product when the largest possible factor is used serves to pass pixel value through the circuit unchanged. Circuits 115, 116, and 117 each receive pixel clock 80 to synchronize their operation with each other and the balance of processor 11.

Transformation circuit 60 has an adder 125 which receives product signals 118 and 119 and provides the sum thereof at data output terminal 62.

Line memory 75 is of double buffered configuration having a first random access memory (RAM) 130 and a substantially identical second RAM 131, and each RAM has a plurality of individually addressable storage locations corresponding individually to pixel values along a video line so that memory 75 is effective in one pixel time interval to store a pixel value from port 76 in one RAM and output a pixel value from the other RAM to port 77. RAM's 130 and 131 each have an input 133 connected to line memory input port 76 and an output 134 selectively connectable by an output multiplexer 135 to output port 77. Each RAM has an address port 137 which serves as an input address connection of line memory 75 when a write enable signal is asserted to write enable terminal 138 of the RAM. Port 137 serves as an output address connection of the line memory when such signal is not asserted at terminal 138.

Line memory 75 has an address control system indicated generally by numeral 140. System 140 has a pair of AND gates 141 with outputs connected individually to terminals 138, each gate having as inputs pixel clock 80 and one of the alternately asserted outputs of a flip-flop 142 which is triggered by line clock 81. As a result, during alternate video lines one of the RAM's 130 or 131 is triggered at its terminal 138 to store pixel values arriving at port 76 while the other of these RAM's outputs previously stored pixel values to multiplexer 135, one output of flip-flop 135 being connected thereto so that the outputting RAM is connected thereby to port 77.

System 140 has a pair of multiplexers 145 each having as inputs count output 71 and line memory address channel 105. The outputs of multiplexers 145 are individually connected to RAM's 130 and 131 at the address ports 137 thereof. System 140 has an exclusive OR gate 147 having as inputs mode signal 85 and an output of flip-flop 142. The output of gate 147 is connected to both multiplexers 145. Multiplexers 145, gate 147, and flip-flop 142 are configured and connected so that, when signal 85 is in its first or reduction condition, count output 71 is directed to address port 137 of the RAM 130 or 131 which is outputting to multiplexer 135 while the line memory address channel 105 is connected to the address port of the other and inputting RAM 130 or 131, and so that, when signal 85 is in its second or expansion condition, channel 105 is connected to address port 137 of the outputting RAM 130 or 131 while count output 71 is connected to such port of the inputting RAM.

Line memory 75 has an input background multiplexer 150, an output background multiplexer 151, and a plurality of background switches 153 into which a desired background pixel value can be set. Multiplexers 150 and 151 are individually controlled by AND gates 155. Each of these gate has two inputs, one being background signal 104 and the other being mode signal 85. The latter signal to the one of the gates 155 associated with multiplexer 150 is inverted by an inverter 156. Signal 104 has a first condition, as when the pixel validity bit of a coefficient being output from coefficient memory 65 is "1", to indicate that a stored pixel value in a storage location of line memory 75 being addressed via channel 105 from the line memory address of the coefficient has a pixel value corresponding to a pixel value input at input 31 of processor 11. Signal 104 has a second condition indicating that the pixel value stored in the line memory at such addressed location corresponds to a predetermined background pixel value from switches 153 and thus unrelated to a pixel value from input 31. Multiplexers 150 and 151, gates 155, and inverter 156 are configured and connected in any suitable manner so that, when mode signal 85 corresponds to the reduction mode of processor 11, output terminal 62 of transformation circuit 60 is connected to line memory input port 76 when signal 104 is in its first condition and switches 153 are connected to port 76 when signal 104 is in its second condition. Multiplexers 150 and 151, gates 155, and inverter 156 are further arranged so that, when mode signal 85 corresponds to the expansion mode of processor 11, port 77 of line memory 75 is connected to data input 61 of transformation circuit 60 when signal 104 is in its first condition and connecting switches 153 are connected to input 61 when signal 104 is in its second condition.

It is apparent that switches 153 generate a predetermined background pixel value. A similar value could, of course, be provided to processor 11 as data from controller 24, either directly to multiplexers 150 and 151 or stored in coefficient memory 65. It is also apparent that multiplexers 150 and 151 and gates 155 respond to signal 104 for selectively directing to transformation circuit 60 either the background pixel value or pixel values of a video line input at input 31.

Figure 4A:
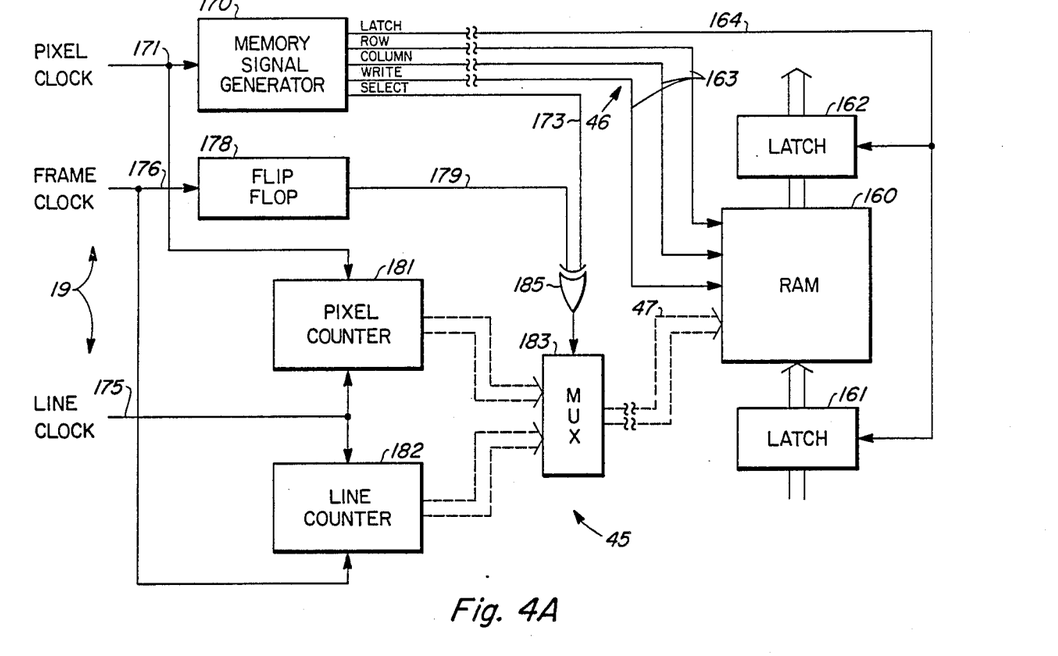
FIG. 4A is a block diagram of portions of a frame memory system and of a signal generator used with the image processor.
Figure 4B:
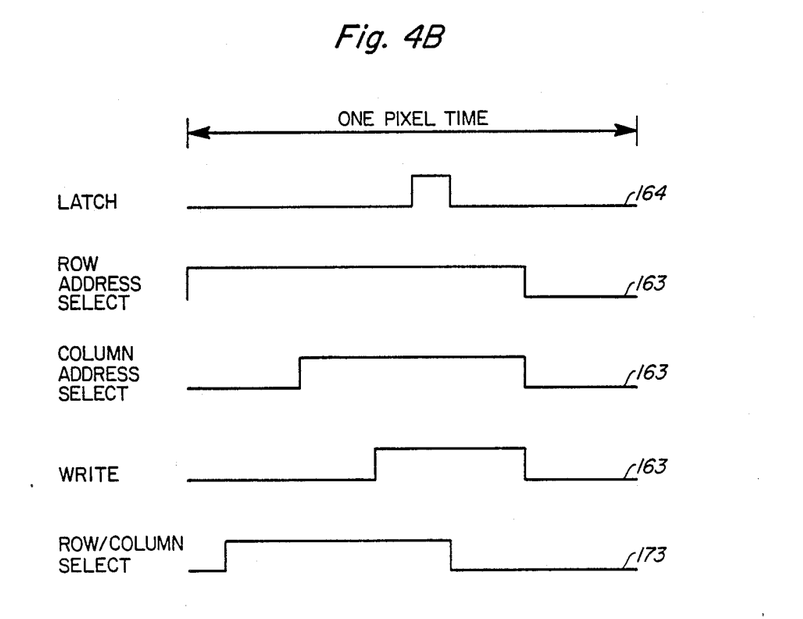
FIG. 4B is a timing diagram for signals occurring in the memory system of FIG. 4A.

Frame memories 33 and 41 each include a plurality of substantially identical random access memory circuits or RAM's, a representative such RAM 160 of memory 33 being shown in FIG. 4A together with an associated input latch 161 and an associated output latch 162. RAM 160 is characterized by having a plurality of storage locations organized as orthogonally related rows and columns and by having, in response to a predetermined signal set, a read-write cycle in which a storage location of the circuit is addressed, outputs data previously stored at the location, and stores new data in substantially less time than a read cycle, in which the circuit is addressed and outputs data, followed by a write cycle in which the location is addressed and stores new data. A typical such RAM is the well-known Motorola MCM 6665 RAM which undergoes such a read-write cycle in response to the signal sequence shown in FIG. 4B occurring over one pixel time interval. A R! 160 of memory 33 or 41, typically, has time-multiplexed row and column addressing provided to the RAM with the corresponding signal 47 or 48. Timing signals 46 include RAM control signals 163, which are such a predetermined signal set provided directly to each RAM 160, and include latch control signal 164 to latches 161 and 162. Preferably, control signals 163 and 164 are provided identically to memories 33 and 41, and signals 47 and 48 are also identical so that, during each pixel time interval, a pair of corresponding storage locations individual to memories 33 and 41 are addressed and undergo a read-write cycle.

Timing and address signal generator 45 includes a memory signal generator 170, shown in FIG. 4A, which in any suitable manner and in response to a pixel clock signal 171 occurring every pixel time interval, generates signals 163 and signal 164 together with a row/column select signal 173. Signals 163, 164 and 173 have a predetermined relation, such as that shown in FIG. 4B, required for time-multiplexed addressing of a RAM 160. Generator 45 also receives a line clock signal 175, which occurs at the end of each video line, and receives a frame clock signal 176 which occurs at the end of each video frame. Signals 171, 175, and 176 are ultimately derived in any suitable manner from signals 19 between generator 45 and camera 30. Generator 45 has a flip-flop 178 triggered to invert its output 179 every video frame by signal 176. Generator 45 includes a pixel counter 181, which is incremented every pixel time by pixel clock 171 which is reset every frame by line clock 175, and a line counter 182 which is incremented every video line and is reset every frame by a frame clock 176. The outputs of counters 181 and 182 are output to a multiplexer 183 which outputs address signal 47 to RAM 160, this signal being preferably identical to signal 48 as before stated. Flip-flop output 179 and row/column select signal 173 are provided to an exclusive OR gate 185 which controls multiplexer 183.

As a result of the arrangements of memory 33 and generator 45 described in the previous two paragraphs, and for reasons which will be apparent below, pixel counter 181 during the above-mentioned alternate video frames addresses RAM 160 at succeeding pixel intervals sequentially along each row while the rows are sequentially selected by counter 182. During the other video frames RAM 160 is addressed sequentially along each column by counter 181 while the columns are sequentially selected by counter 182. Other RAM's of memory 33 and the RAM's of memory 41 undergo similarly alternating row and column addressing. As a result, alternate video frames sweep vertically and then horizontally through synchronized frame memories 33 and 41.

OPERATION

Initially in operation of image processor 10 a desired background pixel value is set into switches 153 and a desired horizontal offset of a processed image relative to an input image is determined by setting switches 98 and 112 of horizontal line processor 11, a desired vertical offset being obtained by corresponding switches, not shown, of vertical processor 12. In operation, memory 65 of processor 11 and the corresponding memory of processor 12 are loaded with the previously described coefficients by simulation controller 24 via processor controller 51 using signals 25, 26, 52 and 53. The coefficients loaded into processor 11 correspond to each pixel value of a horizontal line and the coefficients loaded into processor 12 correspond to each pixel value of a vertical line. The coefficients are, typically, loaded between each video frame so that all horizontal lines thereof undergo the same processing and all vertical lines undergo the same processing. Typically, mode signal 85 is also determined between video frames by signals 26 and 52 to give image reduction or expansion as required by the desired simulated distance to a real object simulated by model object 16, the precise amount of reduction or expansion being determined by the factors from such coefficients provided through channel 100 and 101. Processors 11 and 12, under control of the coefficients, may carry out any first or lower order interpolation between pixel values of an input video line, may perform different interpolations at different portions of the line, can provide a wide range of image size variation, and may utilize at any position along a line a background pixel value from switches 153 instead of an input pixel value. Because of this flexibility, the overall operation of image processor 10 and line processor 11 and 12 will not be described as used with specific transforms or coefficients, but will be described generally with processor 11 as an example.

Processor 11 is shown in FIGS. 3A-3C with RAM 130 inputting pixel values and RAM 131 outputting, as occurs in both the reduction mode and the expansion mode of the processor, the particular mode being determined by signal 85. The pixel value flow in channels 95 and the routing of line memory addresses from coefficient memory 65 and the output from counter 70 to RAMS 130 and 131 is indicated for reduction by solid arrows and is indicated for expansion by dash arrows. It is believed that any difference in data or address flow when RAM 130 is outputting and RAM 131 is inputting will be readily apparent and is not specifically shown.

At each successive pixel time interval and as shown with reference to FIGS. 2 and 5A-5D, processor 11 receives a pixel value of an input video line from A/D converter 30, and generates by a predetermined transform, which is established by the coefficients in memory 65 and mode signal 85, an intermediate transformed pixel value which is received by processor 12 and similarly transformed to generate an output pixel value of an output video line. At each such interval a pixel value is output by the outputting RAM 130 or 131 from the storage location thereof addressed at its port 137 and a pixel value is input by the inputting such RAM to the storage location addressed at its address port 137. At each such interval pixel values provided to circuits 116 and 117 are manipulated thereby in accordance with the corresponding factors from channels 100 or 101 and output as output pixel values to adder 111 which, at each such interval, provides the sum as a transformed pixel value from circuit 60. The values received by circuit 117 were, of course, previously received at each such interval by delay circuit 116 and delayed one such interval. The sum output by adder 111 is thus generated in one such interval from a pair of successive pixel values received at input 31 and the factors received through channel 100 and 101.

Typically, when signal 85 establishes the expansion mode of processor 11, coefficients stored in memory 65 provide effective factors in both channels 100 and 101, provide an accumulate bit which does not assert signal 102, and provide line memory addresses which fetch for circuit 60 selected pixel values from line memory 75, all pixel values of an input line having been previously stored therein sequentially under control of counter 70. If required, background pixel values from switches 153 can be inserted into the input line under the control of the coefficients by asserting signal 104 to multiplexer 151. The transformed pixel values from circuit 60 are thus determined generally by each pair of successive pixel values so selected and are immediately directed from circuit 60 to output 32 as an intermediate video line. The relative weight of each pixel value of such a pair can be varied as required by providing the coefficient corresponding to the pixel time interval with factors having any suitable value between zero and unity.

When signal 85 establishes the reduction mode, pixel values received at input 31 are directed successively and immediately to circuit 60 and the coefficients in memory 65 are, in general, provided with effective but fractional factors for channel 100 to immediate circuit 115, with zero factors for channel 101 to delayed circuit 117, and with an accumulate bit which asserts signal 102 except when the accumulation of a new transformed pixel value is initiated. As a result, at each pixel time interval either such an initial product or an accumulation therewith of successive products is provided at output 62 of circuit 60 and directed to input port 76 of line memory 75. However in the reduction mode, addresses from the memory 65 coefficients select the locations in which pixel values are stored in line memory 75 so that, in effect, only the final accumulated pixel values from circuit 60 are stored. The other pixel values from circuit 60 are overlaid or otherwise disposed of. Background pixel values from switches 153 are inserted by multiplexer 150 under control of signal 104 as determined by the coefficients. In the reduction mode, the output of counter 70 is directed to the address port 137 of the outputting RAM 130 or 131 so that pixel values of the video line therein, although stored at random under control of the memory 75 coefficients, are output sequentially.

The operation of image processor 10 will now be described as this operation occurs with frame memories 33 and 41 connected to line processors 11 and 12 as shown in FIG. 2, with these memories receiving at each pixel time interval the same control signals 163, with address signals 47 and 48 being the same at each such interval, with these signals being generated by controller 45 as shown in FIG. 4A, and with the line processing and frame memories being synchronized to the same pixel interval, line interval, and frame interval by signals 46. FIGS. 5A-5D show the storage of pixel values in memories 33 and 41 during four successive video frames. For simplicity in exposition only five rows and five columns of each of these memories is depicted while horizontal video lines represented by solid line arrows, and vertical video lines, represented by dash line arrows, are read in and out. The number of lines, one through four, of each arrow corresponds to the order, first through fourth, in which the frames are input to processor 10. Memories 33 and 41 are represented at a time when two rows or columns have received new data, when one row or column has received some new data with some old data remaining, and when the other two depicted rows or columns retain old data.

Figure 5A:
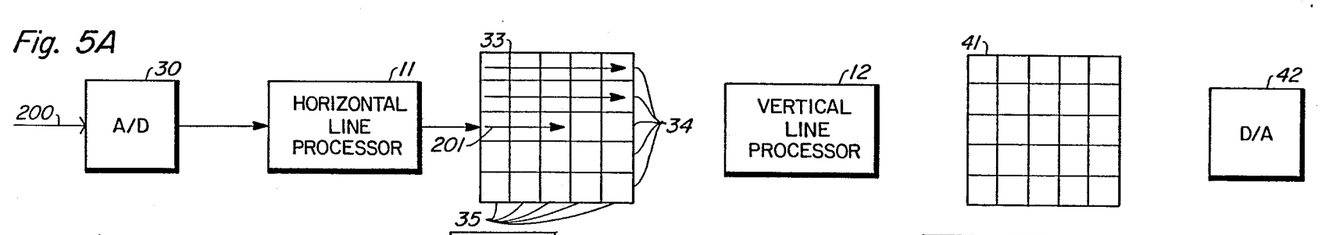
FIGS. 5A–5D are diagrams showing the storage organization of elements of successive images being processed by the image processor of FIG. 2.
Figure 5B:
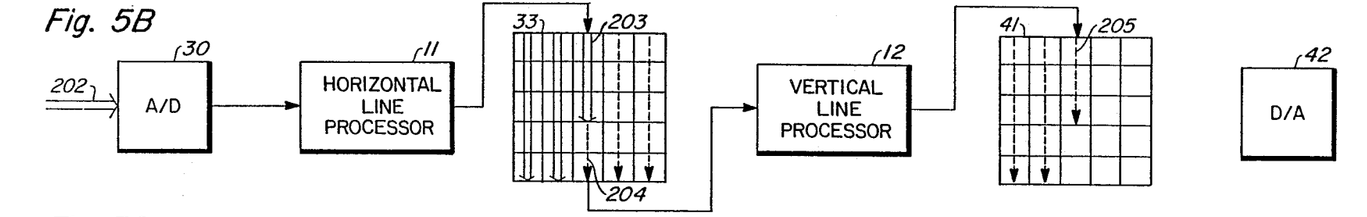

In FIG. 5A a horizontal video line 200 of the fist frame is being received by converter 30 while a horizontal line 201 generated by processor 11 from an earlier received horizontal line of the frame is being stored rowwise of memory 33. No lines are depicted in part of memory 33, processor 12, memory 41, and converter 42 since no portion of the first frame has as yet reached them. In FIG. 5B horizontal line 202 of the second frame is being received by converter 30 while memory 33 is storing columnwise a transformed horizontal line 203 from processor 11, the change in direction of storing occurring as a result of flip-flop 178 of FIG. 4A being triggered between the frames to reverse, by multiplexer 183 under the control of gate 185, the order in which row and column address are provided to each RAM 160. While a horizontal line 203 is being stored in memory 33, a vertical line 204 of the first frame is being read out columnwise from memory 33, the change from horizontal line storage in FIG. 5A to vertical line readout in FIG. 5B occurring as a result of such address reversal and the previously described read-write cycle of RAM 160. Line 204 is provided to processor 12 while a transformed vertical line 205 is stored in memory 47 which is operating columnwise together with memory 33.

Figure 5C:
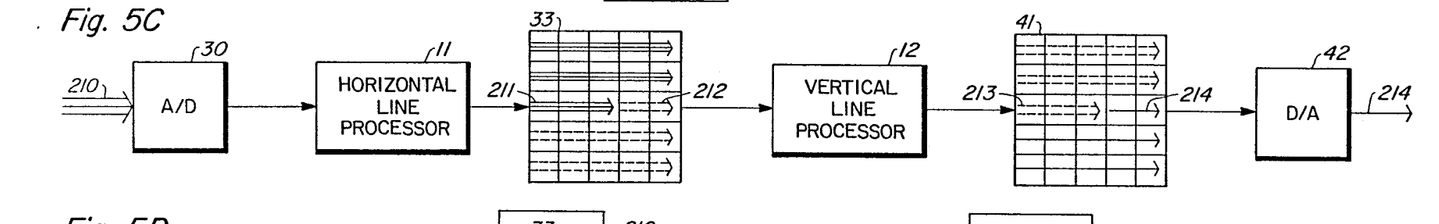
Figure 5D:
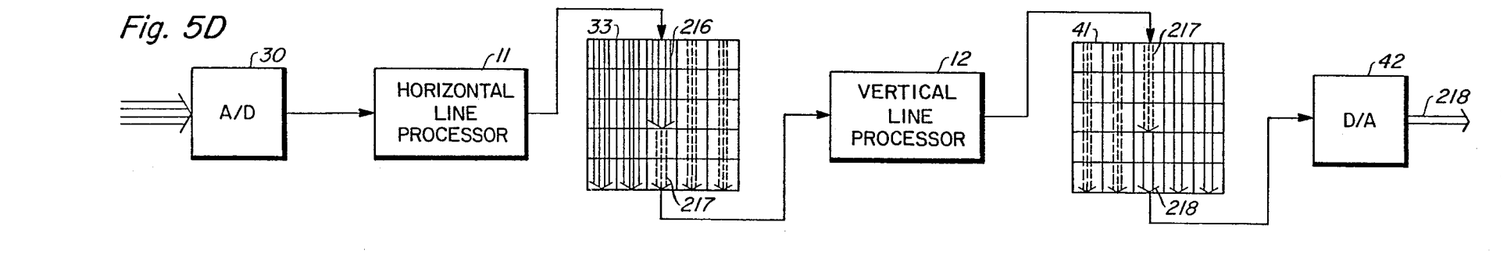

In FIG. 5C a horizontal line 210 of the third frame is being received by converter 30 while a previous horizontal line 211 is output by processor 11 and stored rowwise of memory 33 at the same time a vertical line 212 of the columnwise stored second frame is read rowwise from memory 33 to processor 12. A vertical line 213 corresponding to the second frame is being stored rowwise in memory 41 while this memory outputs a horizontal line 214 corresponding to the first frame to converter 42 for output thereby from processor 10. In FIG. 5D a horizontal line of a fourth frame is received by processor 11 with a horizontal line 216 corresponding to this frame being stored columnwise in memory 33 while vertical line 217 corresponding to the third frame is read and stored respectively by memories 33 and 41. As line 217 is stored in memory 41, a horizontal line 218 corresponding to the second frame is read columnwise from this memory for output from processor 10 by converter 42.

Referring to FIGS. 5C and 5D as an example, it is apparent that each video frame, such as the above discussed third frame, is represented within memories 33 and 41 as a two-dimensional matrix having a set of first vectors, which include horizontal line 211, and a set of second vectors orthogonal to the first vectors, the second vectors of the third frame including vertical 217. The elements of the vectors are pixel values stored in the memories and each first vector corresponds to the time of the corresponding horizontal video line. It can be seen that the rows and columns of each memory correspond individually to the vectors of such a matrix and that, during alternate video frames, each frame memory 33 or 41 outputs elements of a previously stored one of the vector sets from such rows while storing elements of the other of such sets being received along the rows. It can be seen that, during the other video frames, each memory 33 or 41 outputs elements of such one vector set from the columns of the memory and stores elements of the other such set along the columns. It is evident that, due to the read-write cycle of the RAM's of memories 33 and 41 exemplified by RAM 160, during each pixel interval an addressed location of each memory 33 or 41 outputs an element of a first vector from such one set of vectors and stores an element of a second vector from such other set of vectors. As a result, in one video line time the elements of the first vector are output successively from the memory while the elements of the second vector are stored successively in the memory.

Considering image processor 10 as a processor of vectors as described in the previous paragraph, it is apparent that line processor 11 successively receives the first vectors or horizontal lines of an input image and generates therefrom a corresponding first vector of an intermediate matrix stored in first frame memory 11. As a result, the intermediate matrix represents an intermediate image having the size of a portion thereof varied by the line processor from the size of the corresponding portion of the input image in a direction along the first vectors. The transformation of each first vector occurs in substantially one video line time since processor 11, due to the double buffering provided by RAM 130 and RAM 131, is inputting an input vector while outputting a transformed vector corresponding to the previous input vector. It is apparent that, as each vector or line is processed by processor 11, the multiply and accumulate or transformation circuits 115 and 117 receive, at successive pixel time intervals, successive pixel values of the vector together with the corresponding factor provided by channel 100 or 101, these circuits generating pairs of output pixel values determined by each factor and the corresponding pixel value and each pair of output values being summed at each such interval by adder 125 as an element of the vector being generated by line processor 11. It is also apparent that the storage locations of each RAM 130 and RAM 131 correspond individually to the elements or pixel values of the vectors or lines received by processor 11. It is apparent that line memory 75 received via channel 105 the line memory address from each coefficient which is stored in coefficient memory 65 and is addressed at one pixel interval of each video line by sequential counter 70. As a result, line memory 75 is addressed by such address to select a location of the line memory associated by such address with the coefficient having the address.

Referring to FIG. 5C, it is apparent that, during successive video line times, first frame memory 33 receives successively from line processor 11 the first vectors of the intermediate matrix, these vectors corresponding to horizontal lines of a video image and being stored as this matrix as these vectors are received in memory 33.

Memory 33 subsequently outputs in succession the second vectors and generates from each received second vector, in substantially one video line time, a corresponding second vector of an output matrix with the size of a portion thereof varied from the size of the corresponding portion of the intermediate image in a direction along the second vectors. This size variation is performed by processor 12 in substantially the same way as the size variation by processor 11 since these processors are, as before stated, substantially identical. Second frame memory 41 receives successive second vectors of the output matrix from processor 12 during successive line times and stores these vectors as they are received as the output matrix. Memory 41 subsequently outputs in succession the first vectors of this matrix to D/A converter 42 as the horizontal lines of the output image.

The output image is, of course, varied in size from the corresponding input image due to the operations of line processors 11 and 12. The exact size variation need not be defined by loading coefficient memory 65 and selecting mode signal 85 until just before the video frame representing the input image is received by the overall image processor 10. An output image may issue about two frame times, due to storage in frame memories 33 and 41, plus two line times, due to storage in the line memories, such as memory 75, of the line processors 11 and 12, after the corresponding input image of a different size is first provided to video image processor 10. However by reading before writing in frame memories 33 and 42, the two line time delays and any incidental pixel time delays may, in effect, be removed so that the output image is synchronously delayed exactly two frame times in relation to the input image. It is apparent that the size variation is achieved in near real time and is effective for dynamic control system testing.

Many modifications and variations of the present invention are possible in light of the above teachings. It is, therefore to be understood that within the scope of the appended claims the invention may be practiced other than as specifically described.

What is claimed is:

1. A video line processor for use with video lines, each represented by a predetermined number of sequential pixel values corresponding to a predetermined time interval therebetween, to transform an input such line into an output such line, the processor comprising:

an input for pixel values of such an input line;
an output for pixel values of such an output line;
means for generating a count incremented at successive such intervals to correspond to positions of such pixel values along such an input or output line;
coefficient memory means having a plurality of storage locations, which correspond individually to such pixel values along such video line and which are addressed successively during such a video line by said count, for outputting a coefficient from each addressed location of the coefficient memory means, each coefficient including a transformation factor and a line memory address;
pixel transformation means for receiving, at each successive such interval, a pixel value of such an input line and such a transformation factor and for generating from said value and said factor a transformed pixel value of such an output line by a predetermined transform;
line memory means, which has a plurality of individually addressable storage locations corresponding individually to such pixel values along such a video line, has an input address connection, and has an output address connection, for, at each such interval, outputting such a pixel value from the one of said storage locations addressed at the output address connection and storing such a pixel value at the one of said storage locations addressed at the input address connection;

line memory address control means for selectively directing said count to one of said addressing connections and for directing such a line memory address being output by the coefficient memory means to the other of said address connections; and pixel value flow control means for selectively directing pixel values from said input of the line processor to the transformation means or to the line memory means, for selectively directing such transformed pixel values from the transformation means to the line memory means or to said output of the line processor, and for selectively directing pixel values output from the line memory means to the transformation means or to said output of the line processor.

2. The line processor of claim 1 wherein the processor has a reduction mode, in which the line memory address control means directs said count to said output address connection of the line memory means and directs said line memory address to said input address connection thereof and in which pixel values are directed by said flow control means from said input of the processor to the transformation means, from the transformation means to the line memory means, and from the line memory means to said output of the processor and wherein the processor has an expansion mode, in which said address control means directs said count to said input address connection and directs said line memory address to said input address connection and in which pixel values are directed by said flow control means from said input to the line memory means, from the line memory means to the transformation means, and from the transformation means to said output.

3. The line processor of claim 1 wherein each such coefficient contains an immediate such transformation factor and a delayed such transmission factor and wherein the pixel transformation means comprises:

a input terminal receiving such pixel value of an input line;

an immediate transformation circuit which, at each such interval, receives the pixel value received at said input terminal, receives said immediate transform factor, and generates an immediate output pixel value;

a delay circuit which, at each such interval, receives the pixel value received at said input terminal and outputs as a delayed pixel value the pixel value received by the delay circuit at the previous such interval;

a delayed transformation circuit which, at each such interval, receives said delayed pixel value, receives said delayed transformation factor, and generates a delayed output pixel value; and a summing circuit which, at each such interval, receives and sums said output pixel values as such a transformed pixel value.

4. The line processor of claim 3 wherein each such coefficient has a round control bit and an accumulate control bit, wherein one of said transformation circuits receives a round signal determined by the round control bit and an accumulate signal determined by the accumulate control bit, and wherein, at each such interval, said transformation circuit arithmetically multiples the pixel value and the transformation factor received by said circuit to generate a product, round said product or leave said product unchanged in accordance with the accumulate signal, accumulates said product with a previous such product in accordance with the accumulate signal, and outputs the result as the generated pixel value of the transformation circuit.

5. The line processor of claim 1 wherein predetermined pixel values of an output such line are unrelated to pixel values of a corresponding such input line, wherein each such coefficient has a background selection bit which determines a background selection signal of the processor, and wherein the processor further comprises means for generating a predetermined background pixel value and means responsive to said signal for selectively directing said background pixel value or pixel values of such an input line to the transformation means.

6. A video line processor for successively receiving a predetermined first number of digitized input pixel values corresponding to a predetermined pixel time interval therebetween and generating from said values according to a predetermined transform therebetween a predetermined second number of digitized output pixel values, the transform having a reduction mode or an expansion mode indicated by a predetermined mode signal to the processor, and the processor comprising:

an input for said input values;

an output for said output values;

counter means incremented at said interval for generating at a count output a predetermined plurality of count values individually corresponding to a plurality of pixel values along a video line;

a coefficient memory having an output connection and a plurality of storage locations individually addressed by said count value to output to said connection in one such interval from an addressed such storage location a predetermined first transformation factor, a predetermined second transformation factor, and a predetermined line memory address;

a line memory having an input port, an output port, an input address connection, and a plurality of storage locations individually addressable by said count values, the line memory being effective, in one such interval, for addressing such a location though the input address connection to store a pixel value from the input port and for addressing such a location through the output address connection to output a stored pixel value to the output port;

pixel transformation means having a pixel data input for said input values;

a pixel data output for said output values;

a first multiply circuit receiving said first transformation factor from the output connection of the coefficient memory, receiving a pixel value being input at said data input at one said pixel time interval, and generating a first product from said factor and said value;

a delay circuit receiving a pixel value being input at said data input at said one pixel time interval and outputting said value as a delayed pixel value at a predetermined later pixel time interval;

a second multiply circuit receiving said second transformation factor from the output connection of the coefficient memory, receiving said delayed pixel value, and generating a second product from said second factor and said delayed value; and a summing circuit receiving said first product and said second product and outputting the sum thereof to said data output as one of said output pixel values for generating said sum from said factors and said pixel values and outputting said sum in one such interval; and mode switching means receptive to said mode signal for, in the reduction mode;

connecting said count output to said output address connection of the line memory and connecting said input address connection thereof to receive the line memory address from the output connection of the coefficient memory, and connecting said input of the line processor to the pixel data input of the transformation means, connecting the data output thereof to said input port of the line memory, and connecting said output port thereof to said output of the line processor;

and, in the expansion mode;

connecting said count output to said input address connection of the line memory and connecting the output address connection thereof to receive the line memory address from the output connection of the coefficient memory, connecting said input of the line processor to said input port of the line connecting said output port thereof memory, connecting said output port thereof to said pixel data input of the transformation means, and connecting said pixel data output thereof to said output of the line processor.

7. The line processor of claim 6 wherein the output connection of the coefficient memory has a validity signal corresponding to a predetermined pixel validity indicator of such an addressed storage location of the coefficient memory, and said signal has a first condition indicating that a stored pixel value in the line memory storage location, which is addressed by the line memory address from such one addressed location of the coefficient memory, has a pixel value corresponding to one of said input pixel values and has a second condition indicating that such stored pixel value corresponding to a predetermined background pixel value, and wherein the line processor further comprises:

means for generating a background pixel value signal; and validity switching means receiving said mode signal and said validity signal for, in the reduction mode, connecting said pixel data output of the transformation means to the input port of the line memory when said validity signal is in the first condition and connecting said background value signal to said input port when the validity signal is in the second condition;

and, in the expansion mode, connecting the output port of the line memory to said data input of the transformation means when the validity signal is in the first condition and connecting said background value signal to said pixel data input when the validity signal is in the first condition.

8. An image processor for varying the size of images from successive video frames each represented within the processor by a two-dimensional matrix having a set of first vectors and a set of second vectors orthogonal thereto, each first vector corresponding to a predetermined video line time and the elements of the first vectors being pixel values in which adjacent pixel values correspond to a predetermined pixel time interval therebetween and the image processor comprising:

a first video line processor successively receiving such first vectors representing an input image and generating from each such received first vector substantially in one such lie time a corresponding first vector of an intermediate matrix representing an intermediate image with the size of a portion thereof varied in size from the corresponding portion of the input image in a direction along the first vectors;

first frame memory means for receiving successively the first vectors of the intermediate matrix from the first line processor during successive such line times, for storing said vectors as received as the intermediate matrix, and for subsequently outputting in succession the second vectors thereof;

a second video line processor successively receiving the second vectors of the intermediate matrix and generating from each received second vector substantially in one such line time a corresponding second vector of an output matrix representing an output image with the size a portion thereof varied in size from the corresponding portion of the intermediate image in a direction along the second vectors;

second frame memory means for receiving successive second vectors of the output matrix from the second line processor during successive such line times, for storing such vectors as received as the output matrix, and for subsequently outputting in succession the first vectors thereof; and clock means for providing to said line processors and said frame memory means a signal defining said pixel time interval;

wherein each of said frame memory means is organized as orthogonally related rows and columns corresponding individually to vectors of such a two-dimensional matrix and said frame memory means outputs, during alternate such frames, elements of one of said sets of vectors from such rows and stores elements of the other of said sets being received by the frame memory along such rows and said frame memory means outputs, during the other such frames, elements of one of said sets of vectors from such columns and stores elements of the other of said sets being received by the frame memory along such columns; and wherein each of said line processors includes:

a pair of multiply and accumulate circuits, each circuit receiving at successive such pixel time intervals successive pixel values of the vector being received by the corresponding line processor, receiving at each such interval a factor corresponding to the pixel value received thereof, and generating a circuit output pixel value determined by the factor and the corresponding pixel value;

means for delaying the pixel values received by one of said circuits one such interval in relation to the pixel value received by the other such circuit;

means for summing the pair of circuit output values from said pair of circuits at each such interval as an element of the vector being generated by the processor;

coefficient memory means, which has a plurality of storage locations corresponding individually to the elements of a vector received by the line processor, for storing at each of said locations and for outputting therefrom a coefficient containing a line memory address and a pair of such factors used by said pair of circuits at one such interval;

counter means for addressing said coefficient memory locations successively for output of said coefficients therefrom at successive such intervals during such a video line time corresponding to such a vector received by the line processor: and a line memory having a plurality of storage locations corresponding individually to the elements of each vector received by the line processor and receiving such line memory address from each such coefficient for addressing of the line memory thereby to select a location of the line memory associated with the coefficient.

9. The image processor of claim 8:

wherein the coefficient memory of each of said line processors has a line memory address output connection for such a coefficient stored in such memory and addressed by said counter means;

wherein the line memory means of each of said line processors has a pixel value input port, a pixel value output port, an input address connection, and an output address connection; and wherein each of said line processors includes a pixel data input, a pixel data output, an input connection for pixel values to the multiply and accumulate circuits of the line processor, an output connection for pixel values form the summing means of the line processor, and a count output connection from said counter means thereof, and includes mode selection means, which has a first condition and a second condition, for in the first condition, connecting said pixel data input of the line processor to said input connection of the multiply and accumulate circuits, connecting said output connection of the summing means to said input port of the line memory means, connecting said output of the line memory means to said pixel data output of the line processor, connecting said count output connection to said output address connection of the line memory, and connecting said line memory address output connection of the coefficient memory to said input address connection of the line memory;

and, in the second condition, connecting said pixel data input of the line processor to said input port of the line memory means, connecting said output port of the line memory means to said input connection to the multiply and accumulate circuits, connecting said count output connection to said output address connection of the line memory, and connecting said line memory address output connection of the coefficient memory to said output address connection of the line memory.

10. The image processor of claim 8 wherein each of said frame memory means comprises:

a memory circuit having, in response to a predetermined signal set, a read-write cycle in which a storage location of the circuit is addressed, outputs a previously stored element of such a vector, and stores another element of such a vector, in substantially less time than a read cycle, in which such a location is addressed and outputs data, followed by a write cycle, in which the location is addressed and stores data; and means for generating said signal set during each of successive such pixel time intervals so that, during each of such intervals, such a location of the memory circuit outputs an element of a first vector from said one set of vectors and stores an element of a second vector from said other set of vectors, whereby, in one such line time, the elements of said first vector are output successively from the memory while the elements of said second vector are stored successively therein.

* * * * *